(12) United States Patent
Jang

(10) Patent No.: US 8,001,566 B2
(45) Date of Patent: Aug. 16, 2011

(54) DIGITAL TV AND CONTROL METHOD OF THE SAME

(75) Inventor: Bong-ki Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 594 days.

(21) Appl. No.: 11/581,473

(22) Filed: Oct. 17, 2006

(65) Prior Publication Data

US 2007/0093203 A1   Apr. 26, 2007

(30) Foreign Application Priority Data

Oct. 25, 2005   (KR) .................. 10-2005-0100885

(51) Int. Cl.
*H04N 5/445*   (2006.01)
*G06F 3/00*   (2006.01)

(52) U.S. Cl. ............... 725/39; 725/37; 725/38; 725/40; 715/719; 715/720; 715/721; 715/722

(58) Field of Classification Search ............ 725/37–40; 715/719–722
See application file for complete search history.

(56) References Cited

U.S. PATENT DOCUMENTS

| 5,907,323 | A  | * | 5/1999 | Lawler et al. | 725/41 |
| 2001/0052126 | A1 | * | 12/2001 | Nanki et al. | 725/55 |
| 2002/0018637 | A1 | * | 2/2002 | Saito | 386/40 |
| 2002/0070958 | A1 | * | 6/2002 | Yeo et al. | 345/723 |
| 2004/0239809 | A1 | * | 12/2004 | Kim et al. | 348/563 |

FOREIGN PATENT DOCUMENTS

| CN | 1373963 A | 10/2002 |
| CN | 1455586 A | 11/2003 |
| CN | 1674645 A | 9/2005 |
| EP | 1 361 752 A2 | 11/2003 |
| JP | 2004-336312 A | 11/2004 |
| KR | 1020030001170 A | 1/2003 |
| KR | 10-2004-0065053 A | 7/2004 |
| KR | 1020040098988 A | 11/2004 |
| KR | 10-2005-0023704 A | 3/2005 |
| WO | 01/13630 A1 | 2/2001 |

* cited by examiner

*Primary Examiner* — Dominic D Saltarelli
*Assistant Examiner* — Gigi L Dubasky
(74) *Attorney, Agent, or Firm* — Sughrue Mion, PLLC

(57) ABSTRACT

A digital broadcasting receiving apparatus which receives broadcasting signals corresponding to a plurality of channels, the digital broadcasting receiving apparatus including: a first tuner that tunes one of the broadcasting signals; and a controller that controls the first tuner to successively tune the broadcasting signals for each channel, captures image information for a program of a tuned broadcasting signal at a predetermined time interval, and storing detailed program information comprising the captured image information.

18 Claims, 3 Drawing Sheets

DIGITAL TV AND CONTROL METHOD OF THE SAME

CROSS-REFERENCE TO RELATED APPLICATIONS

This application claims priority from Korean Patent Application No. 10-2005-0100885, filed on Oct. 25, 2005, in the Korean Intellectual Property Office, the disclosure of which is incorporated herein by reference.

BACKGROUND OF THE INVENTION

1. Field of the Invention

Methods and apparatuses consistent with the present invention relate to a digital broadcasting reception and control, and more particularly, to a digital broadcasting receiving apparatus displaying an electronic program guide (EPG) on a screen and a control method thereof.

2. Description of the Related Art

Generally, a digital broadcasting receiving apparatus compresses and transports digital video signals, digital audio signals and digital data signals. The digital data signals include program information and PSIP (program and system information protocol) information.

PSIP, that is, the Advanced Television System Committee (ATSC) standard of terrestrial waves and cable digital television includes a Master Guide Table (MGT) as a basic table, a Virtual Channel Table (VCT), an Event Information Table (EIT), an Extended Time Table (ETT), a Rating Region Table (RRT) and a System Time Table (STT).

A digital broadcasting receiving apparatus provides the EPG for users according to PSIP, so that a list of channels, channel orders and each program allotted by time are displayed on an EPG screen. The digital broadcasting receiving apparatus also provides users with brief information on the selected program if the users select a channel and a program on the EPG screen. However, it is difficult for users to read and understand program information because the program information is generally made of text.

SUMMARY OF THE INVENTION

The present invention provides a digital broadcasting receiving apparatus and a control method thereof in order that users can read and understand detailed information of programs quickly without difficulty.

According to an aspect of the present invention, there is provided a digital broadcasting receiving apparatus which receives broadcasting signals corresponding to a plurality of channels, including a first tuner that tunes the broadcasting signal; and a controller that controls the first tuning part to successively tune the broadcasting signals by each channel, capturing image information of the tuned broadcasting signals from at least one of a plurality of programs in a predetermined time interval, and storing detailed program information including at least one of the captured image information.

According to another aspect of the present invention, the digital broadcasting receiving apparatus may also include a user input unit, and a display unit that displays an image, and wherein the controller displays an EPG window including at least one of program titles on the display unit according to a first control signal received from the user input unit, and displays the detailed program information corresponding to the program titles selected according to a second control signal received from the user input unit to select one of the program titles.

According to another aspect of the present invention, the controller includes a signal processing part that processes the tuned broadcasting signal; a storage unit that stores the detailed program information including the image information according to each of the programs; and a microcomputer that controls the signal processing part to process the image information captured in the predetermined time interval, and allows the display part to display the detailed program information stored on the display unit if receiving the first and second control signals.

According to another aspect of the present invention, the detailed program information includes at least one of channel information, a program title, program starting time, program ending time and final stored time of a program.

According to another aspect of the present invention, the image information includes a moving image.

According to another aspect of the present invention, the predetermined time intervals are different from each other according to broadcasting time of the program.

According to another aspect of the present invention, the received broadcasting signal includes program service information, and if receiving the second control signal, the microcomputer searches the program service information corresponding to the selected program, and then, displays the detailed program information on a basis of searching results.

According to another aspect of the present invention, the program service information includes at least one of channel information, a program title, program starting time, and program ending time.

According to another aspect of the present invention, the digital broadcasting receiving apparatus may also include a second tuner tuning the broadcasting signal corresponding to the channel selected by a user.

According to an aspect of the present invention, there is provided a method of controlling a digital broadcasting receiving apparatus receiving broadcasting signals corresponding to a plurality of channels, which includes a user input unit and a display unit that displays an image, the method including: successively tuning the broadcasting signals corresponding to the plurality of channels; capturing image information of the tuned broadcasting signal from at least on of a plurality of programs in a predetermined time interval; and storing detailed program information including at least one of the captured image information.

According to another aspect of the present invention, the method of controlling the digital broadcasting receiving apparatus includes displaying an EPG window including at least one of program titles on the display unit according to a first control signal received from the user input unit; and displaying the detailed program information corresponding to the program title selected according to a second control signal received from the user input unit to select one of the program titles.

According to another aspect of the present invention, the detailed program information includes at least one of channel information, a program title, program starting time, program ending time and final stored time of a program.

According to another aspect of the present invention, the received broadcasting signal includes program service information, and the displaying the detailed program information includes searching the program service information corresponding to the selected program if receiving the second control signal.

According to another aspect of the present invention, the program service information includes at least one of channel information, a program title, program starting time, and program ending time.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
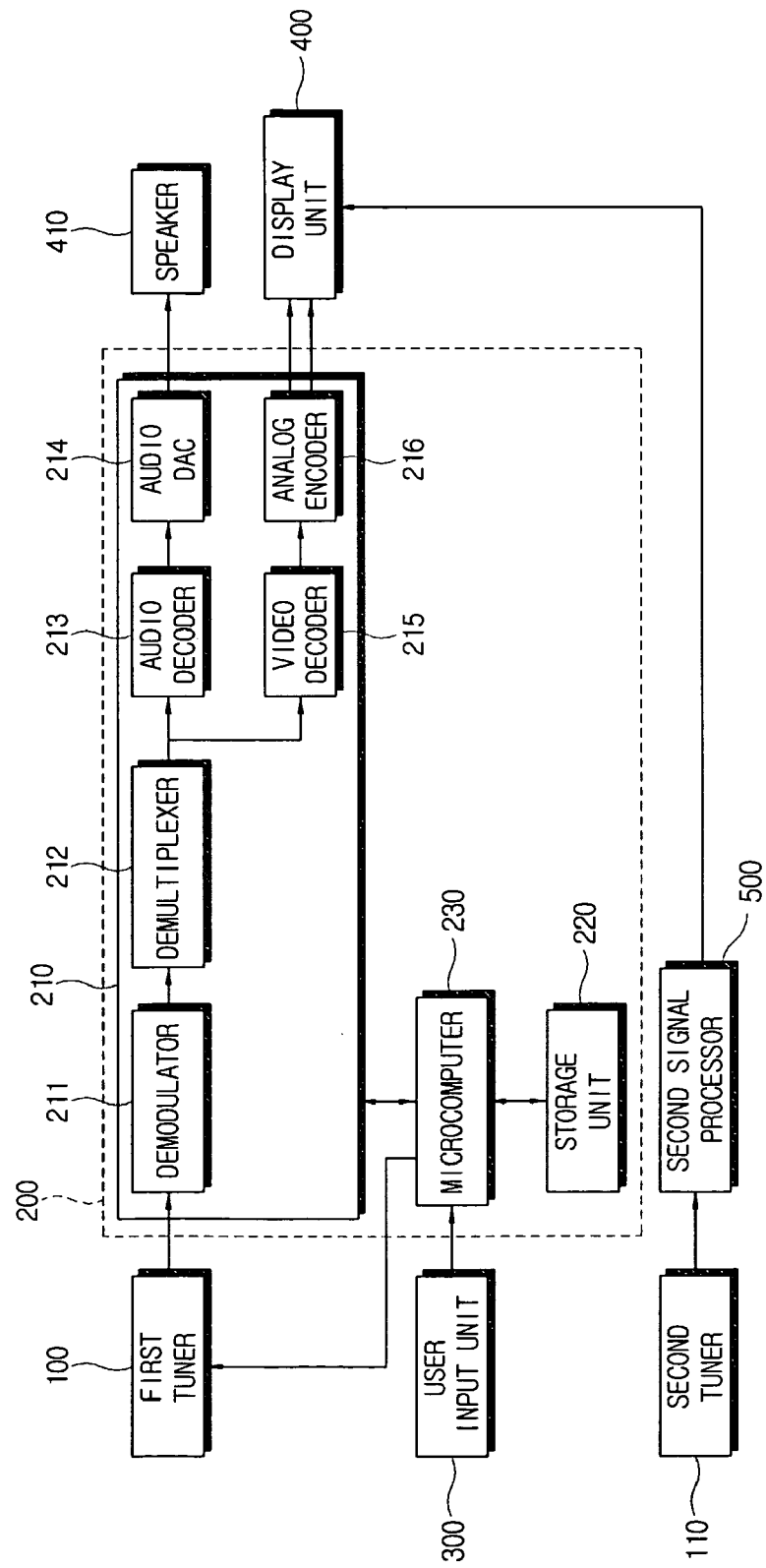
FIG. 1 is a control block diagram of a digital broadcasting receiving apparatus according to an exemplary embodiment of the present invention.

Reference will now be made in detail to the exemplary embodiments of the present invention, which are illustrated in the accompanying drawings, wherein like reference numerals refer to like elements throughout.

FIG. 1 is a control block diagram of a digital broadcasting receiving apparatus according to an exemplary embodiment of the present invention. As shown in FIG. 1, the digital broadcasting receiving apparatus includes first and second tuners 100 and 110 to tune broadcasting signals corresponding to a plurality of channels, a controller 200, a user input unit 300, a display unit 400, a speaker 410 and first and second signal processing parts 210 and 500, respectively.

Generally, a single tuner is equipped in the digital broadcasting receiving apparatus with the exception of the digital broadcasting receiving apparatus comprising a Picture In Picture (PIP) function. However, the digital broadcasting receiving apparatus according to the present invention comprises two tuners 100 and 110 and two signal processors 210 and 500 which process each broadcasting signal tuned by each tuner.

The first turning part 100 successively tunes broadcasting signals corresponding to a plurality of channels by control of a microcomputer 230. That is, the first tuner 100 does not continually tune one channel but successively tunes a plurality of channels according to a channel map including information on channels, which the digital broadcasting receiving apparatus can currently receive, in order to capture image information by program in a predetermined time interval. The broadcasting signal received by the first tuner 100 through terrestrial waves and cables includes program service information used to display an Electronic Program Guide (EPG) in addition to image information and voice information of programs.

Herein, the image information is used as a term designating information on images provided when digital signals included in the broadcasting signals or processed digital signals are displayed on the display unit 400. The program service information includes channel information, program titles, program starting time, program ending time and so on corresponding to related broadcast programs.

The user input unit 300 generates a first control signal which causes to display the EPG on the display unit 400 and a second control signal which causes to display detailed program information on the display part 400 by selecting a program title as a user operates it.

The controller 200 comprises a first signal processor 210, a storage unit 220, and a microcomputer 230. The first signal processor 210 forms image information by processing the tuned broadcasting signals. The storage unit 220 stores the detailed program information including the formed image information from a plurality of programs. The microcomputer 230 controls the first signal processor 210 and the storage unit 220. The controller 200 forms the detailed program information and displays the detailed program information according to the first and second control signals from the user input unit 300.

The first signal processor 210, which includes a demodulator 211, a demultiplexer 212, an audio decoder 213, an audio DAC 214, a video decoder 215 and an analog encoder 216, forms image information by processing the broadcasting signals.

The demodulator 211 demodulates the received digital broadcasting signals, and then, provides data for the demultiplexer 212 by a format of an MPEG 2 transport stream.

The demultiplexer 212 abstracts image information and voice information from the input MPEG 2 transport stream, and then, outputs each of them to the audio decoder 213 and the video decoder 215. Generally, the voice information is processed by am MPEG-2 AAC format, and the image information is processed by an MPEG-2 video format. Also, the demultiplexer 212 condenses program service information from the input broadcasting signals, and the storage unit 220 stores the condensed program service information by control of the microcomputer 230.

The audio decoder 213 restores the input voice information to original signals by decoding with MPEG algorithm. The decoded voice information is changed to analog voice information by the audio DAC 214, and then output to the speaker 410.

The image information output from the demultiflexer 212 is restored to original signals by decoding with MPEG algorithm through the video decoder 215, and the decoded image information is displayed on the display unit 400 through the analog encoder 216. The analog encoder 216 encodes the MPEG video-decoded image information to analog signals.

When power is applied to turn on the digital broadcasting receiving apparatus, the microcomputer 230 allows the first tuner 100 to tune broadcasting signals by channel, and controls the first signal processor 210 and the storage unit 220 to store image information by capturing it in a predetermined time interval.

Conventionally, the detailed program information is configured in a text format. According to the present invention, in order to inform users of image information of programs directly, but not in text form, the detailed program information is displayed along with other program service information on the basis of a plurality of image information which is collected and stored according to each program. For this, the first tuner 100 successively tunes a plurality of channels, and the first signal processor 210 captures image information from at least one of a plurality of programs in a predetermined time interval by control of the microcomputer 230.

The time intervals of information-capturing are different from each other according to broadcasting times. For example, if the digital broadcasting receiving apparatus has five receivable channels, the first tuner 100 will successively tune the broadcasting signals corresponding to five programs corresponding to each channel. Suppose that image information included in detailed program information is set up with 10 still images. In case that the broadcasting time of a program received from the first channel is 60 minutes and the broadcasting time of a program received from the second channel is 30 minutes, the image information will be captured every six minutes for the broadcasting signal of the first channel because the still image corresponding to a program from the first channel should be formed every six minutes, and in the same way, the image information for the broadcasting signal of the second channel will be captured every three minutes corresponding to a program from the second channel. It is possible that the number of still images and the time intervals of information-capturing are set up and changeable as necessary of users.

Also, capturing of image information is performed for moving images as well as still images. If several second moving images are captured and stored, users can remember previous programs without difficulty through the detailed program information, and the image information including moving images is effectively suitable for users who are familiar with the moving images.

The image information is stored as one of the detailed program information including program service information corresponding to related programs and storage time at which the image information is stored.

The detailed program information stored according to each program is displayed on the screen by the first and second control signals from the user input unit 300. The detailed program information displayed on the screen is explained as follows referring to FIG. 2.

A current broadcasting signal window 10, an EPG window 20, and a detailed information window 30 are displayed on the display unit 400. The current broadcasting signal window 10 displays each program corresponding to the program channels viewed by users. The EPG window 20 is formed by the first control signal output from the user input unit 300. Finally, the detailed information window 30 is formed by the second control signals from the user input unit 300.

The EPG window 20 includes channel information 21 on a plurality of channels that can be tuned, program titles 23 of programs received from each channel and time information 22 displaying times of broadcasting programs. The microcomputer 230 displays the EPG window 20 on the display unit 400 by using the program service information stored in the storage unit 220 if the first control signal is received. If the EPG window is displayed, the broadcasting program displayed on the whole display unit 400 is reduced to a small screen like the current broadcasting signal window 10.

Users can activate one of the program titles 23 by using a remote-controlling device or a control button, and can select the program titles 23 by moving from one activated program title to another among the program titles 23.

The microcomputer 230 searches program service information on a related program if the second control signal is received for selecting the program title 23. The microcomputer 230 searches the detailed program information corresponding to the program service information on a basis of the program service information corresponding to the program title 23. If the detailed program information corresponding to the selected program service information is searched, the related detailed program information is displayed on the display unit 400. In case of searching by using the program starting and ending time, the searching scope of the microcomputer 230 is 30 minutes before and after the program starting time and before and after the program ending time, respectively. In case of repeated programs including a time interval of every day, every week or other time periods according to the exemplary embodiment of the present invention, the program information broadcasted previously can be effectively provided for users. Because the broadcasting time of the repeated programs including a time interval may be changeable, as mentioned above, it is preferable but not necessary to enlarge searching scope in case of searching by using time information.

The detailed information window 30 displays a plurality of image information 31 captured in a predetermined time interval, text information 32 introducing brief summary, features and the like with regard to a related program and time information 33. The time information includes program channels, program starting time, program ending time, and final storage time at which related image information is finally stored.

Figure 2:
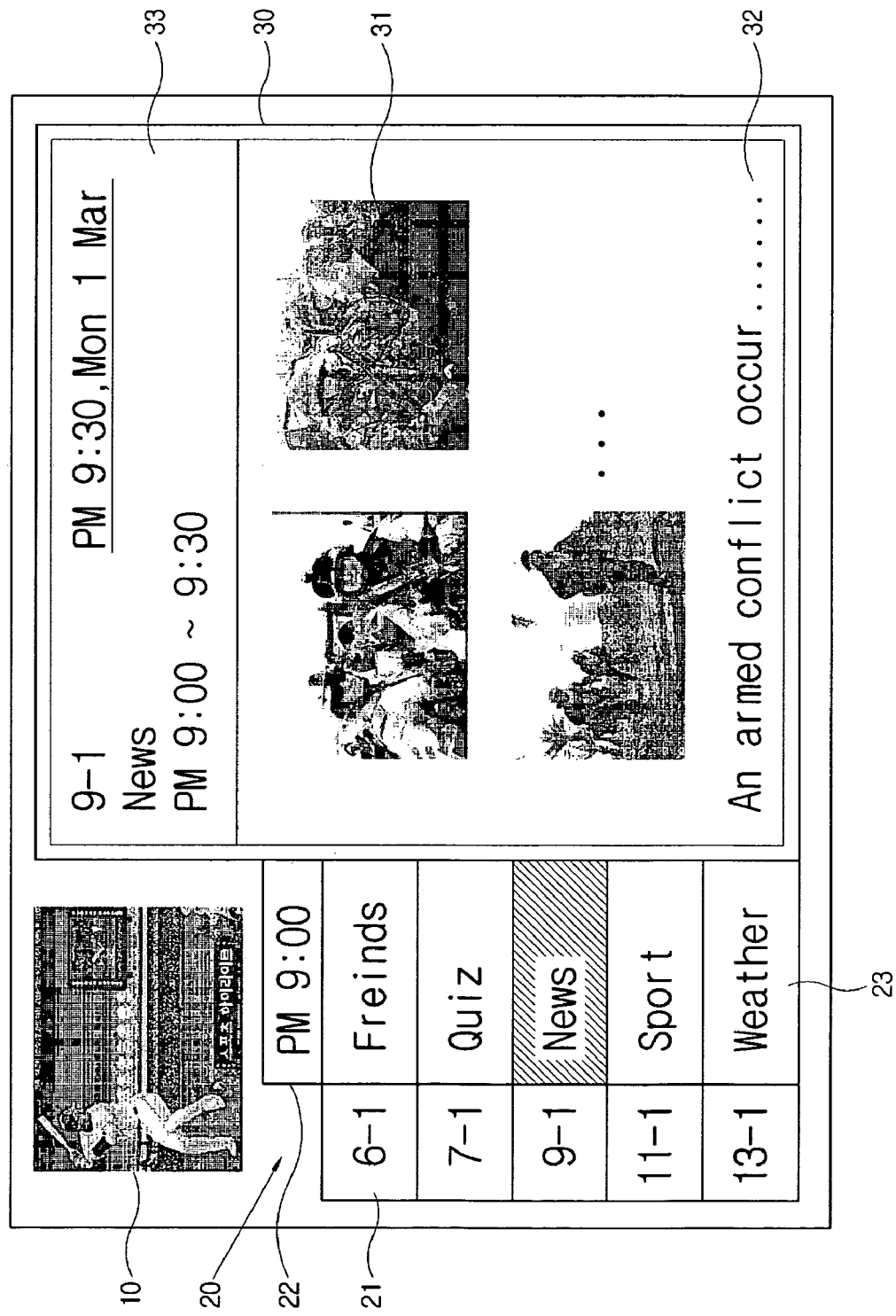
FIG. 2 shows detailed information of programs displayed on a screen according to an exemplary embodiment of the present invention.

As shown in FIG. 2, the program title of "news" broadcasted at 9:00 PM is activated among the broadcasting signals received from channel 9-1 in the EPG window 20. If users select the "news," the detailed program information window 30 corresponding to the program "news" is displayed. Through the detailed program information window 30, the users can get the information that the "news" is broadcasted from 9:00 PM through 9:30 PM, and stored finally at 9:30 PM, Monday, March 1. Also, the users can understand quickly the contents of the "news" through a plurality of image information 32. As mentioned above, it is more effective to provide a plurality of image information for users, and it is more preferable but not necessary to include moving images as image information.

The second tuner 110 tunes the broadcasting signals corresponding to channels selected by users. If power is applied to turn on the digital broadcasting receiving apparatus, and a user selects a channel, the second tuner 110 receives the broadcasting signal corresponding to the selected channel without regard to a plurality of the channels successively tuned by the first tuner 100.

The broadcasting signals tuned by the second tuner 110 are displayed on the display unit 400 after being processed in the second signal processor 500. The second signal processor 500 performs the same process as the first signal processor 210.

By displaying detailed program information display of the digital broadcasting receiving apparatus, as mentioned above, the information of the repeated broadcasting program including a time interval can be effectively provided for users, and the users can remember the program quickly after more promptly receiving the related program information.

Figure 3:
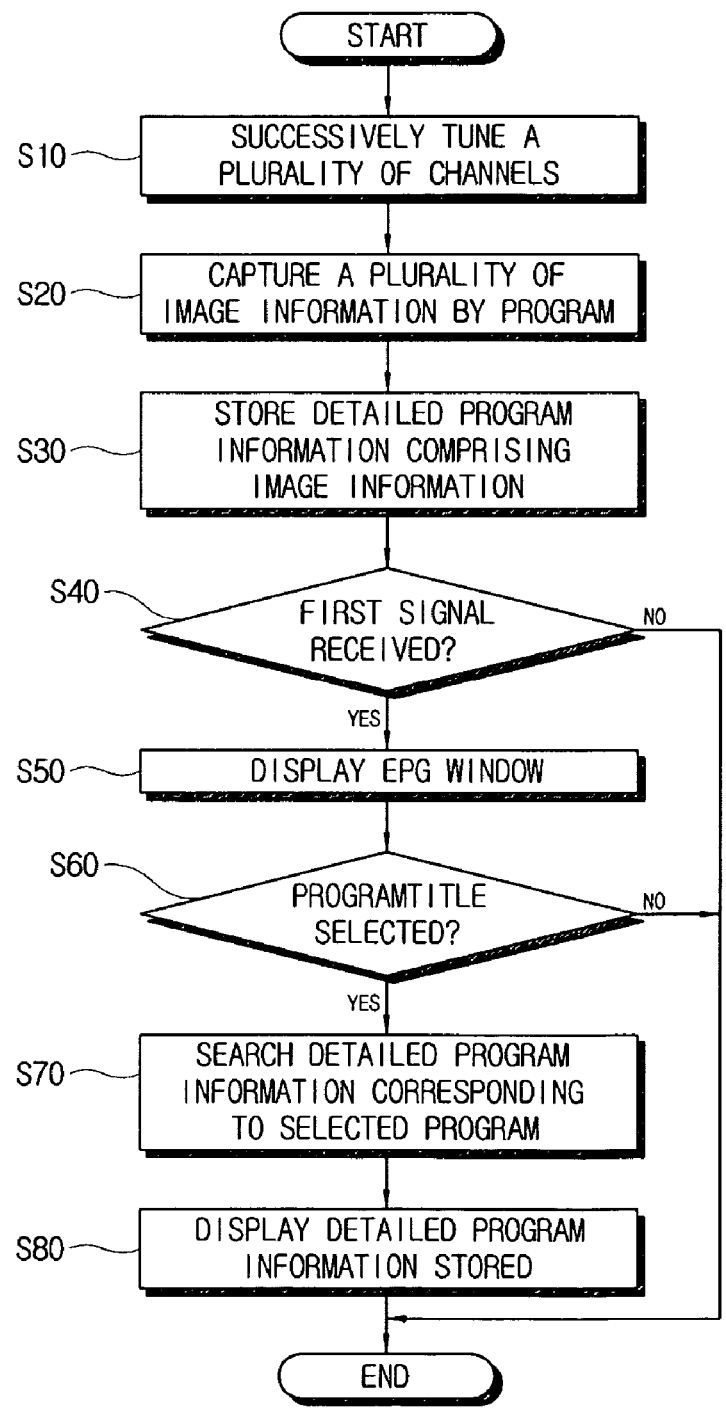
FIG. 3 is a control flowchart of a control method of the digital broadcasting receiving apparatus according to an exemplary embodiment of the present invention.

FIG. 3 is a control flowchart of a control method of the digital broadcasting receiving apparatus according to an exemplary embodiment of the present invention.

First of all, a plurality of channels are successively tuned (S10), and then a plurality of image information is captured by program (S20). The image information is captured in a predetermined time interval, and the time intervals of information-capturing are differently set up and changeable according to broadcasting times.

The image signals are captured through the successive tuning of channels, and the detailed program information, including a plurality of image information, are stored according to each program (S30).

After receiving the first control signal which displays the EPG window 20 (S40), the microcomputer 230 allows the display unit 400 to display the EPG window 20 by using program service information stored in the storage unit 220 (S50). If the second control signal for selecting the program title 23 from the EPG window 20 to display the detailed program information window 30 is received (S60), the microcomputer 230 searches the detailed program information corresponding to the selected program title 23 (S70).

Finally, the detailed program information stored previously on a basis of the searching results is displayed (S80).

Accordingly, users can understand features and contents of the programs on a basis of the image information without difficulty.

Although exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A digital broadcasting receiving apparatus which receives broadcasting signals corresponding to a plurality of channels, the digital broadcasting receiving apparatus comprising:
   a first tuner which tunes one of the broadcasting signals;
   a display unit which displays an image;
   a controller which controls the first tuner to successively tune the broadcasting signals for each channel, captures a plurality of image information for each program of a tuned broadcasting signal, each of the plurality of image information being captured at a predetermined time interval over a duration of each program, stores detailed program information comprising the plurality of captured image information and controls the display unit to simultaneously display each of the plurality of captured image information corresponding to a previous program of a series of programs which are periodically broadcast, if a current program of the tuned broadcasting signal belongs to the series of programs and differs from the previous program; and
   an input unit which generates a first control signal and a second control signal;
   wherein the controller controls the display unit to display an electronic program guide (EPG) comprising at least one of a plurality of program titles according to the first control signal received from the input unit, the at least one program title including a program title of the current program, and to generate a window which displays detailed program information including the plurality of captured image information corresponding to the previous program if the program title of the current program is selected according to the second control signal received from the input unit to select one of the program titles.

2. The digital broadcasting receiving apparatus according to claim 1, wherein the detailed program information comprises at least one of channel information, a program title, a program starting time, a program ending time and a final stored time of a program.

3. The digital broadcasting receiving apparatus according to claim 2, further comprising:
   a second tuner which tunes one of the broadcasting signals corresponding to the channel selected by a user.

4. The digital broadcasting receiving apparatus according to claim 1, wherein the controller comprises:
   a signal processor which processes the tuned broadcasting signal;
   a storage unit which stores the detailed program information according to each of the programs; and
   a microcomputer which controls the signal processor to process the image information captured in the predetermined time interval, and controls the display unit to display the stored detailed program information if the first and second control signals are received.

5. The digital broadcasting receiving apparatus according to claim 4, wherein the received broadcasting signal comprises program service information, and
   if the second control signal is received, the microcomputer searches the program service information corresponding to the selected program, and then, displays the detailed program information based on a result of searching.

6. The digital broadcasting receiving apparatus according to claim 5, wherein the program service information comprises at least one of channel information, a program title, a program starting time, and a program ending time.

7. The digital broadcasting receiving apparatus according to claim 1, wherein each image information comprises a moving image.

8. The digital broadcasting receiving apparatus according to claim 1, wherein the predetermined time interval varies according to broadcasting time of the program.

9. The digital broadcasting receiving apparatus according to claim 8, wherein the predetermined time interval is determined based on a broadcasting time of the program.

10. The digital broadcasting receiving apparatus according to claim 9, wherein the predetermined time interval is further determined based on a number of captured image information to be included in the detailed program information.

11. The digital broadcasting receiving apparatus according to claim 10, wherein the image information is captured in even increments during the broadcasting time of the program.

12. A method of controlling a digital broadcasting receiving apparatus receiving broadcasting signals corresponding to a plurality of channels, the method comprising:
   successively tuning the broadcasting signals corresponding to the plurality of channels;
   capturing a plurality of image information for each program of a tuned broadcasting signal, each of the plurality of image information being captured at a predetermined time interval over a duration of each program;
   storing detailed program information comprising the captured image information;
   simultaneously displaying each of the captured plurality of image information corresponding to a previous program of a series of programs which are periodically broadcast, if a current program of the tuned broadcasting signal belongs to the series of programs and differs from the previous program; and
   displaying an electronic program guide (EPG) comprising at least one of a plurality of program titles according to a first control signal received from an input unit of the digital broadcasting receiving apparatus, the at least one program title including a program title of the current program;
   wherein the simultaneously displaying each of the captured plurality of image information comprises generating a window which displays detailed program information including the captured plurality of image information corresponding to the previous program if the program title of the current program is selected according to a second control signal received from the input unit to select one of the program titles.

13. The method according to claim 12, wherein the detailed program information comprises at least one of channel information, a program title, a program starting time, a program ending time and a final stored time of a program.

14. The method according to claim 12, wherein the received broadcasting signal comprises program service information, and
   the displaying the detailed program information comprises searching the program service information corresponding to the selected program if the second control signal is received.

15. The method of controlling the digital broadcasting receiving apparatus according to claim 12, wherein the program service information comprises at least one of channel information, a program title, a program starting time, and a program ending time.

16. The method of controlling the digital broadcasting receiving apparatus according to claim 12, wherein the predetermined time interval is determined based on a broadcasting time of the program.

17. The method of controlling the digital broadcasting receiving apparatus according to claim 16, wherein the predetermined time interval is further determined based on a number of captured image information to be included in the detailed program information.

18. The method of controlling the digital broadcasting receiving apparatus according to claim 17, wherein the image information is captured in even increments during the broadcasting time of the program.

* * * * *